United States Patent
Kobayashi

(10) Patent No.: US 7,962,262 B2
(45) Date of Patent: Jun. 14, 2011

(54) VEHICLE STEERING APPARATUS

(75) Inventor: Yukihiro Kobayashi, Okazaki (JP)

(73) Assignee: Jtekt Corporation, Osaka-shi (JP)

( * ) Notice: Subject to any disclaimer, the term of this patent is extended or adjusted under 35 U.S.C. 154(b) by 1043 days.

(21) Appl. No.: 11/758,429

(22) Filed: Jun. 5, 2007

(65) Prior Publication Data

US 2008/0004772 A1 Jan. 3, 2008

(30) Foreign Application Priority Data

Jun. 19, 2006 (JP) .................. 2006-168902

(51) Int. Cl.
*B62D 6/00* (2006.01)

(52) U.S. Cl. ......... 701/41; 180/6.2; 180/6.24; 180/6.54; 280/5.51

(58) Field of Classification Search .................. 701/41; 280/5.51, 211, 263, 442, 93.506, 771; 180/204, 180/6.2, 6.24, 6.44, 6.54, 400

See application file for complete search history.

(56) References Cited

U.S. PATENT DOCUMENTS

| | | | | |
|---|---|---|---|---|
| 5,265,019 A | * | 11/1993 | Harara et al. | 701/41 |
| 5,884,724 A | * | 3/1999 | Bohner et al. | 180/402 |
| 6,135,233 A | * | 10/2000 | Yamauchi | 180/443 |
| 7,377,356 B2 | * | 5/2008 | Turner et al. | 180/446 |
| 2002/0129988 A1 | * | 9/2002 | Stout et al. | 180/400 |
| 2005/0216155 A1 | * | 9/2005 | Kato et al. | 701/41 |
| 2005/0229592 A1 | | 10/2005 | Kobayashi | |

FOREIGN PATENT DOCUMENTS

| | | |
|---|---|---|
| EP | 1 325 857 A2 | 7/2003 |
| JP | 62 238167 A | 10/1987 |
| JP | 62 238168 A | 10/1987 |
| JP | 5-69848 | 3/1993 |
| JP | 2002-225701 | 8/2002 |
| WO | WO 2004/065195 A | 8/2004 |

OTHER PUBLICATIONS

JP 7-315241 Translation.*
JP 62-238167 Translation.*
JP 62-238168 Translation.*

* cited by examiner

*Primary Examiner* — Thomas G Black
*Assistant Examiner* — Ce Li
(74) *Attorney, Agent, or Firm* — Oblon, Spivak, McClelland, Maier & Neustadt, L.L.P.

(57) ABSTRACT

A first computing section stores a plurality of types of variable transmission ratio characteristics prescribed in correspondence with different modes in the form of maps. With reference to one of the maps corresponding to a selected one of the modes, the first computing section computes a first command angle by which the variable transmission ratio characteristics prescribed by the map are brought about. In this manner, variable gear ratio control is carried out. After a subsequent mode has been selected, the first computing section does not switch the maps which are referred to in the variable gear ratio control if the steering wheel turning angle θs is greater than or equal to a predetermined threshold value α.

17 Claims, 3 Drawing Sheets

VEHICLE STEERING APPARATUS

BACKGROUND OF THE INVENTION

The present invention relates to a vehicle steering apparatus having a variable transmission ratio device.

As a typical vehicle steering apparatus, there is a type that changes steering characteristics of a vehicle by switching power assistance characteristics or variable transmission ratio (variable gear ratio) characteristics of the vehicle (see, for example, Japanese Laid-Open Patent Publications Nos. 2002-225701 and 5-69848). For example, a plurality of types of variable transmission ratio characteristics are set in correspondence with different traveling states and controlled in accordance with different "modes" (such as normal, sport, and parking modes). The modes are selected and switched either through operation of the driver or automatically. In this manner, the steering characteristics are optimized in correspondence with the current traveling state.

However, in switching of the variable transmission ratio characteristics, the steered angle representing the control target (the target steered angle) may be greatly altered through change of the transmission ratio (the gear ratio). That is, for example, if the gear ratio is changed from 30% to 50% when the steering wheel turning angle is maintained at a constant value of 300°, the target steered angle is greatly altered from 90° to 150°. This causes the variable transmission ratio device to rapidly operate to adjust the actual steered angle in correspondence with the change of the target steered angle, or to quickly change the steered angle. Such rapid operation of the variable transmission ratio device, or quick change of the steered angle, may influence the behavior or steering feel of the vehicle.

To solve this problem, typically, a difference in the target steered angle caused through switching of the variable transmission ratio characteristics is temporarily stored in a memory. When the deviation between the target steered angle and the actual steered angle is computed, small portions of the difference are gradually combined with the target steered angle. In this manner, the target steered angle is offset, and the difference in the target steered angle gradually is reduced to almost zero. This prevents the above-described problem.

However, if the variable transmission ratio characteristics are switched when steering is performed at a great operating angle, the difference in the target steered angle is also great. This limits the effect on switching of the variable transmission ratio characteristics regardless of the above-described procedure. Further, if the steering wheel is returned to the neutral position before the aforementioned difference is completely canceled, the difference that has not been cancelled causes the neutral position of the steering wheel to be offset from the neutral position of the steered wheels. This problem has yet to be solved and, in this regard, the vehicle steering apparatus must be further improved.

SUMMARY OF THE INVENTION

Accordingly, it is an objective of the present invention to provide a vehicle steering apparatus that smoothly switches variable transmission ratio characteristics without influencing the behavior or steering feel of a vehicle and while preventing the neutral positions of a steering wheel and steered wheels from becoming offset from each other.

To achieve the foregoing objective and in accordance with one aspect of the present invention, a vehicle steering apparatus having a steering wheel, a variable transmission ratio device, and control means is provided. The variable transmission ratio device varies a transmission ratio between a steering wheel turning angle determined through manipulation of the steering wheel and a steered angle of a steered wheel by combining a first operating angle of the steered wheel determined through manipulation of the steering wheel with a second operating angle of the steered wheel determined through actuation of a motor. The control means controls operation of the variable transmission ratio device to bring about predetermined variable transmission ratio characteristics, and maintains a plurality of types of variable transmission ratio characteristics in a switchable state. If the steering wheel turning angle is smaller than a predetermined threshold value, the control means switches the variable transmission ratio characteristics. If the steering wheel turning angle is greater than or equal to the threshold value, the control means does not switch the variable transmission ratio characteristics.

Specifically, change of the target steered angle caused through switching of the variable transmission ratio characteristics becomes greater as (the absolute value of) the steering wheel turning angle becomes greater. That is, if the steering wheel turning angle is small, or, for example, close to the neutral position of the steering wheel, the absolute magnitude of the target steered angle does not greatly change even if the gear ratio has been greatly changed. Thus, as has been described, the steered angle is prevented from being quickly and greatly changed since the variable transmission ratio characteristics are switched only when the absolute size of the target steered angle is not greatly changed by alteration of the gear ratio, or only when the steering wheel turning angle is extremely small. This restricts the influence of such switching on the behavior or steering feel of the vehicle. In this manner, the difference in the target steered angle caused through switching of the gear ratio is decreased and canceled in a short time. This prevents the neutral positions of the steering wheel and the steered wheels from becoming offset from each other, unlike the above-described case.

DETAILED DESCRIPTION OF THE PREFERRED EMBODIMENTS

A vehicle steering apparatus having a variable transmission ratio device according to one embodiment of the present invention will now be described with reference to the attached drawings.

Figure 1:
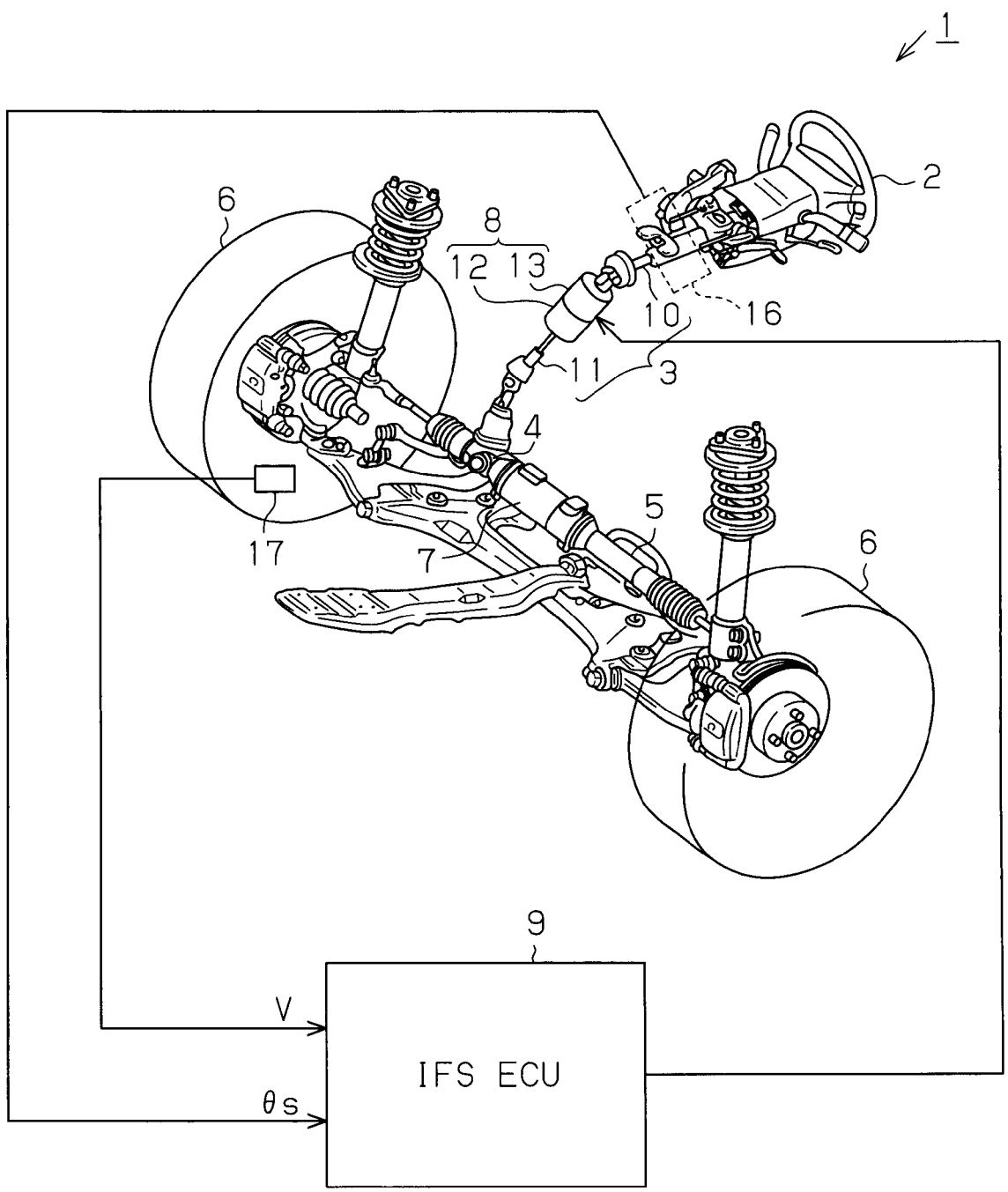
FIG. 1 is a view schematically showing a vehicle steering apparatus.
Figure 2:
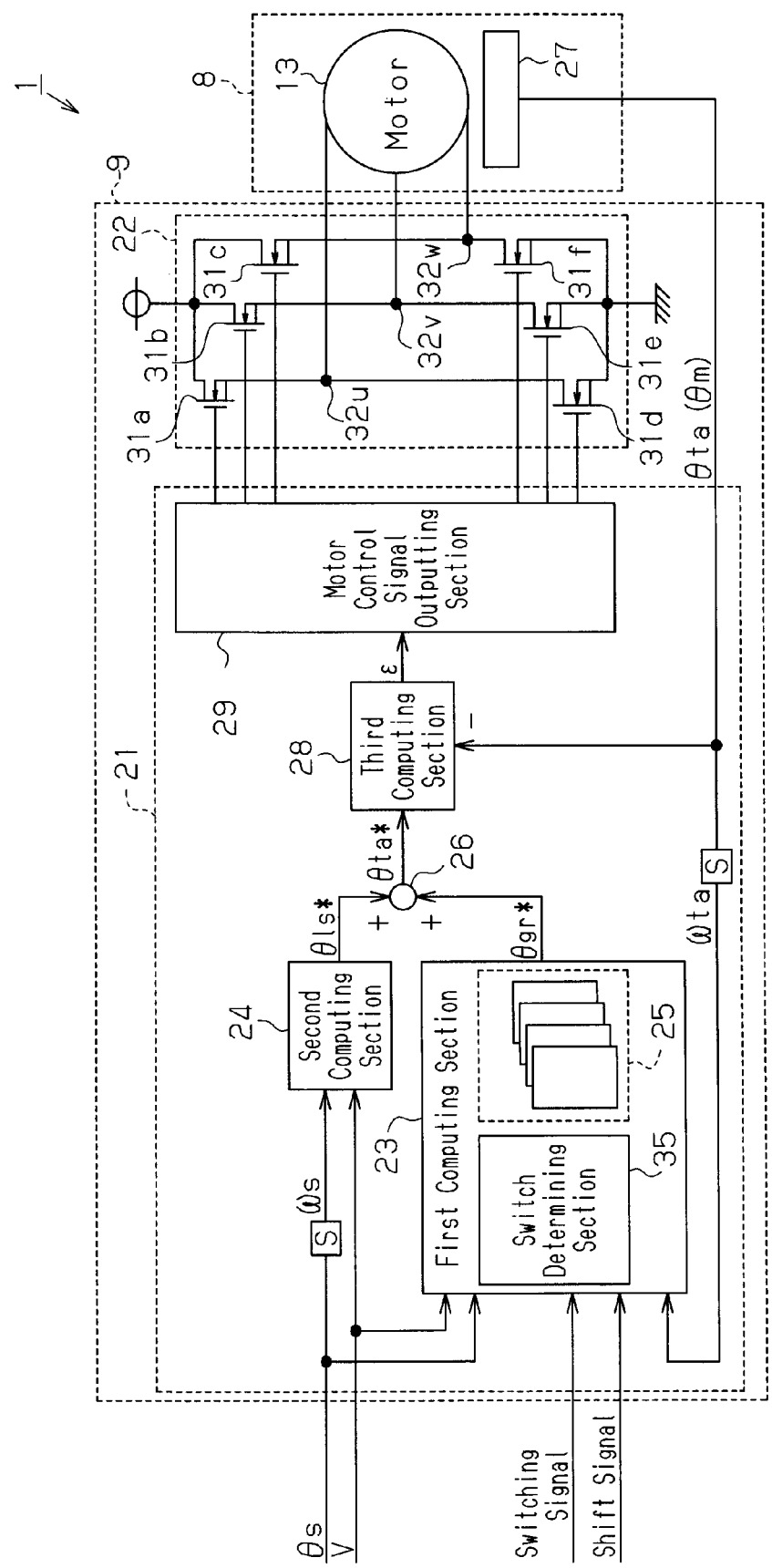
FIG. 2 is a control block diagram representing the vehicle steering apparatus.
Figure 3A:
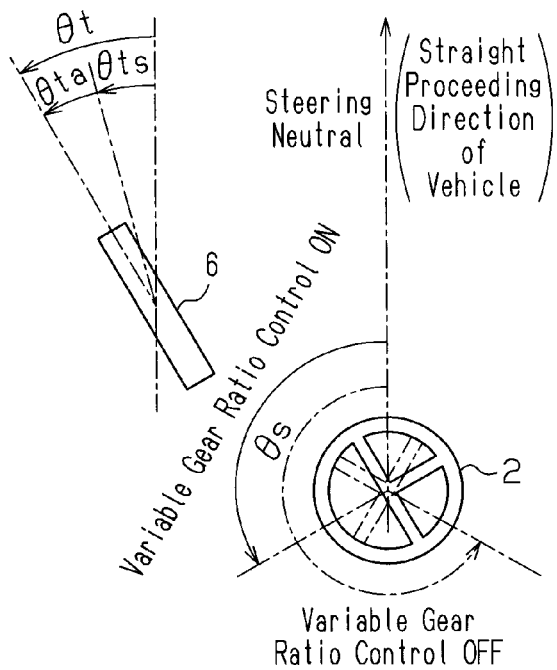
FIGS. 3(a) and 3(b) are views for explaining operation of a variable transmission ratio device.
Figure 3B:
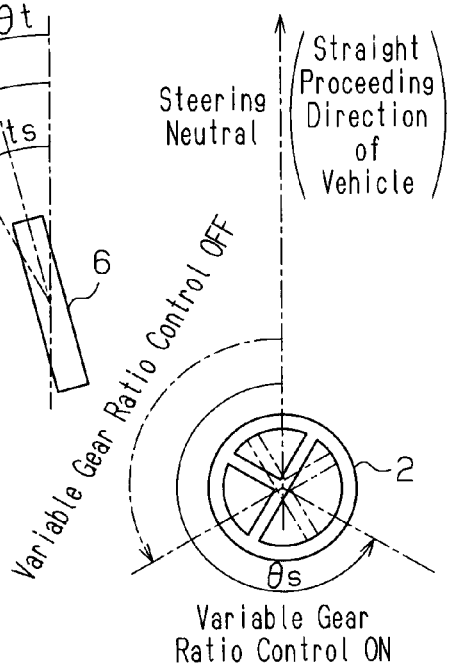

FIG. 1 is a view schematically showing a vehicle steering apparatus 1. FIG. 2 is a control block diagram representing the vehicle steering apparatus 1. FIGS. 3(a) and 3(b) are views for explaining operation of a variable transmission ratio device 8. As shown in FIG. 1, a steering shaft 3, to which a steering wheel 2 is fixed, is connected to a rack 5 through a rack-and-pinion mechanism 4. When the steering shaft 3 is rotated through manipulation of the steering wheel 2, such rotation is converted into linear reciprocation of the rack 5 by the rack-and-pinion mechanism 4. This changes the operating angle of a steered wheel 6, or the steered angle. The direction in which the vehicle is heading is thus altered. In the illustrated embodiment, the vehicle steering apparatus 1 is a rack-assist type electric power steering apparatus (EPS). Specifically, assist torque is generated by a motor 7, as a drive source, through a ball screw mechanism (not shown) and transmitted to the rack 5. In this manner, the assist force is provided to the steering system.

The vehicle steering apparatus 1 of the illustrated embodiment includes a variable transmission ratio device 8 and an IFSECU (Intelligent Front Steering Electronic Control Unit) 9, or control means that controls operation of the variable transmission ratio device 8. The variable transmission ratio device 8 changes the transmission ratio (the gear ratio) between the operating angle of the steering wheel 2 (the steering wheel turning angle) and the operating angle of the steered wheel 6 (the steered angle).

Specifically, the steering shaft 3 is formed by a first shaft 10, to which the steering wheel 2 is connected, and a second shaft 11, which is connected to the rack-and-pinion mechanism 4. The variable transmission ratio device 8 has a differential mechanism 12 and a motor 13. The differential mechanism 12 connects the first shaft 10 to the second shaft 11. The motor 13 drives the differential mechanism 12. The variable transmission ratio device 8 combines rotation through driving of the motor 13 with rotation of the first shaft 10, which is caused by manipulation of the steering wheel 2. The combined rotation is then transmitted to the second shaft 11. In this manner, the rotational speed of the steering shaft 3, which is input to the rack-and-pinion mechanism 4, is increased (or decreased).

In other words, as illustrated in FIGS. 3(*a*) and 3(*b*), the variable transmission ratio device 8 combines the operating angle (the first operating angle $\theta ts$) of the steered wheel 6 determined through manipulation of the steering wheel 2 with the operating angle (the second operating angle $\theta ta$) of the steered wheel 6 determined through actuation of the motor. In this manner, the variable transmission ratio device 8 varies the transmission ratio between the steering wheel turning angle $\theta s$ and the steered angle $\theta t$.

As used herein, "combining" one value with another refers to subtracting one value from another as well as adding one value to another. If "the transmission ratio between the steering wheel turning angle $\theta s$ and the steered angle $\theta t$" is represented by an overall gear ratio (the steering wheel turning angle $\theta s$/the steered angle $\theta t$), the overall gear ratio is decreased (the steered angle $\theta t$ is increased; see FIG. 3(*a*)) by combining the first operating angle $\theta ts$ with the second operating angle $\theta ta$ in the same direction as the direction of the first operating angle $\theta ts$. Contrastingly, the overall gear ratio is increased (the steered angle $\theta t$ is decreased; see FIG. 3(*b*)) by combining the first operating angle $\theta ts$ with the second operating angle $\theta ta$ in the direction opposite to the direction of the first operating angle $\theta ts$.

In the illustrated embodiment, the motor 13 is a brushless type and rotated by drive power having three phases (U, V, W) supplied from the IFSECU 9. Through such supply of the drive power, the IFSECU 9 controls the rotation of the motor 13 to control the operation of the variable transmission ratio device 8, or the second operating angle $\theta ta$ (variable transmission ratio control).

The electric configuration and the control method of the vehicle steering apparatus of the illustrated embodiment will hereafter be explained.

As illustrated in FIG. 1, the steering wheel turning angle $\theta s$ (the steering wheel turning speed $\omega s$) detected by a steering wheel turning angle sensor 16 and the vehicle speed V detected by a vehicle speed sensor 17 are input to the IFSECU 9. The IFSECU 9 controls the operation of the variable transmission ratio device 8 by controlling the rotation of the motor 13 in correspondence with the steering wheel turning angle $\theta s$ (the steering wheel turning speed $\omega s$) and the vehicle speed V. In this manner, the IFSECU 9 executes the variable transmission ratio control.

Specifically, as illustrated in FIG. 2, the IFSECU 9 has a microcomputer 21 and a driver circuit 22. The microcomputer 21 outputs a motor control signal. The driver circuit 22 provides drive power to the motor 13 in accordance with the motor control signal.

The microcomputer 21 has a first computing section 23 and a second computing section 24. The first computing section 23 performs variable gear ratio control, and the second computing section 24 executes differentiation steering control. The steering wheel turning angle $\theta s$ and the vehicle speed V are input to the first computing section 23. The vehicle speed V and the steering wheel turning speed $\omega s$ are input to the second computing section 24. The first computing section 23 calculates a first command angle $\theta gr^*$, which is a control target element with reference to which the gear ratio (the transmission ratio) is changed in correspondence with the vehicle speed V. The second computing section 24 computes a second command angle $\theta ls^*$, which is a control target element with reference to which the responsiveness of the vehicle is improved in correspondence with the steering wheel turning speed $\omega s$.

Further specifically, the vehicle steering apparatus 1 of the illustrated embodiment has a plurality of modes in order to optimize the steering characteristics in correspondence with different traveling states. The first computing section 23 stores (in a memory) a plurality of types of variable transmission ratio characteristics that are prescribed for each of the modes in the form of maps 25. In each of the maps 25, the steering wheel turning angle $\theta s$ and the vehicle speed V are associated with the first command angle $\theta gr^*$. The first computing section 23 refers to one of the maps 25 corresponding to a selected one of the modes and thus computes the first command angle $\theta gr^*$. The first command angle $\theta gr^*$ is used to instruct change of the gear ratio that brings about the variable transmission ratio characteristics prescribed by the map 25.

In the illustrated embodiment, the first computing section 23 receives a switching signal and a shift signal. The switching signal indicates that a switch provided in the passenger compartment has been manipulated by the driver. The shift signal indicates the shift position. In accordance with these signals, the first computing section 23 selects a subsequent mode through instruction by the driver or automatically. The first computing section 23 thus switches the currently used one of the maps 25 to the corresponding one of the maps 25.

The first command angle $\theta gr^*$ and the second command angle $\theta ls^*$, which are computed by the first computing section 23 and the second computing section 24, respectively, are input to an adder 26. The adder 26 then superimposes the first command angle $\theta gr^*$ on the second command angle $\theta ls^*$ to obtain a third command angle $\theta ta^*$.

A rotation angle sensor 27, which is mounted in the motor 13, is connected to the IFSECU 9. The third command angle $\theta ta^*$, which has been computed by the adder 26, is input to a third computing section 28, together with the second operating angle $\theta ta$, which has been computed in correspondence with the motor rotation angle $\theta m$ output from the rotation angle sensor 27. The third computing section 28 executes position control. Specifically, the third computing section 28 carries out feedback computation based on the deviation between the third command angle θta*, or the command value, and the second operating angle θta, or the actual value. In this manner, the third computing section 28 determines a current command ε and outputs the obtained value to a motor control signal outputting section 29. The motor control signal outputting section 29 generates a motor control signal based on the current command ε.

In the illustrated embodiment, the driver circuit 22 is formed by a plurality of (2×3) switching elements (FETs) corresponding to each of the modes of the motor 13. In other words, a series circuit of FETs 31a, 31d, a series circuit of FETs 31b, 31e, and a series circuit of FET 31c, 31f are connected together in parallel. A connection point 32u of the FETs 31a, 31d, a connection point 32v of the FETs 31b, 31e, and a connection point 32w of the FETs 31c, 31f are connected to motor coils of the corresponding phases of the motor 13. The gate terminals of the FETs 31a to 31f are connected to the microcomputer 21. In response to the motor control signal output from the microcomputer 21 (the motor control signal outputting section 29), each of the FETs 31a to 31f is selectively turned on and off. This converts the DC power of the power source mounted in the vehicle into the drive power of the three phases. The power is then supplied to the motor 13.

(Switching Control of Variable Transmission Ratio Characteristics)

As illustrated in FIG. 2, the first computing section 23 of the microcomputer 21 has a switch determining section 35. The switch determining section 35 determines whether switching to the variable transmission ratio characteristics corresponding to the subsequent mode that has been selected is necessary, or whether the currently used one of the maps 25 should be switched to the corresponding one of the maps 25. Specifically, if the subsequent mode has been selected and the switch determining section 35 determines that the maps 25 should be switched, the first computing section 23 switches the maps 25, with reference to which the variable gear ratio control is executed.

Figure 4:
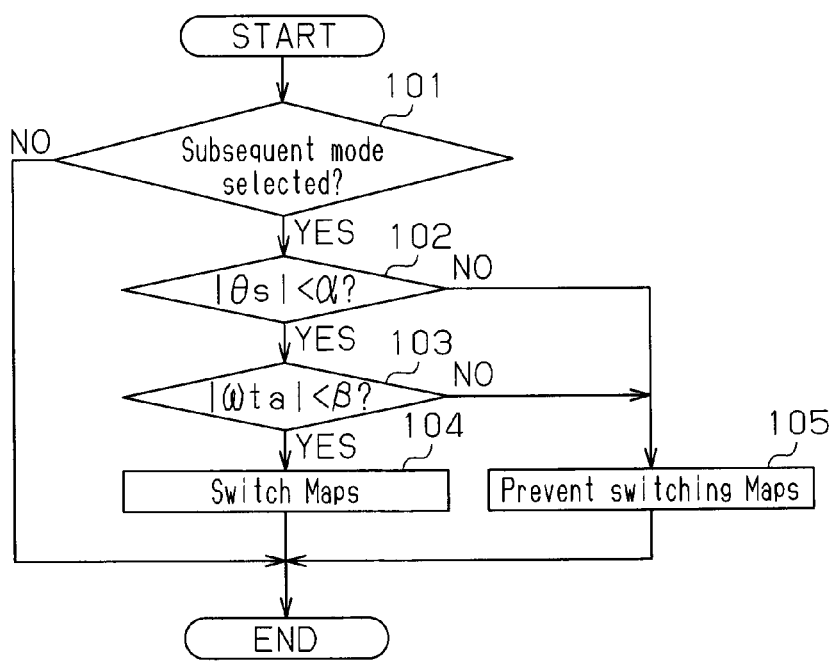
FIG. 4 is a flowchart representing a control procedure of determination in switching of variable transmission ratio characteristics (maps).

Specifically, as is clear from the flowchart of FIG. 4, the switch determining section 35 determines whether a subsequent mode has been selected (step 101). If the subsequent mode has been selected (step 101: YES), the switch determining section 35 determines whether (the absolute value of) the steering wheel turning angle θs is smaller than a predetermined threshold value α (step 102). In the illustrated embodiment, the second operating angle speed ωta is input to the switch determining section 35 (see FIG. 2). Thus, if the steering wheel turning angle θs is smaller than the threshold value α (|θs|<α, step 102: YES) in step 102, the switch determining section 35 determines whether the second operating angle speed ωta is smaller than a predetermined threshold value β (β=substantially "0", step 103). If the second operating angle speed ωta is smaller than the threshold value β (|ωta|<β, step 103: YES), the switch determining section 35 determines that the maps 25 must be switched (step 104). If the steering wheel turning angle θs is greater than or equal to the threshold value α in step 102 (|θs|≧α, step 102: NO), or the second operating angle speed ωta is greater than or equal to the threshold value β (|ωta|≧β, step 103: NO) in step 103, the switch determining section 35 determines that the maps 25 should not be switched (step 105). If, in step 101, the subsequent mode has not yet been selected (step 101: NO), the switch determining section 35 does not perform the procedures of steps 103 to 105.

As has been described, in the illustrated embodiment, if the steering wheel turning angle θs is greater than or equal to the predetermined threshold value α, the first computing section 23 does not switch the maps 25, with reference to which the variable gear ratio control is carried out, even after the subsequent mode has been selected.

In other words, change of the target steered angle (the third command angle θta*+the second operating angle θts) caused by switching of the variable transmission ratio characteristics becomes greater as (the absolute value of) the steering wheel turning angle θs becomes greater. Thus, if the steering wheel turning angle θ is small, or, for example, close to the neutral position of the steering wheel 2, the absolute magnitude of the target steered angle does not greatly change even if the gear ratio has been greatly changed. Thus, as has been described, the steered angle θt is prevented from being quickly and greatly changed since the variable transmission ratio characteristics are switched only when the absolute size of the target steered angle is not greatly changed by change of the gear ratio, that is, only when the steering wheel turning angle θs is extremely small, or after the steering wheel turning θs becomes extremely small. This restricts the influence of such switching on the behavior or the steering feel of the vehicle. In this manner, the difference in the target steered angle caused by switching of the gear ratio is decreased and canceled in a short time. Thus, the neutral position of the steering wheel is prevented from becoming offset from the neutral position of the steered wheel, unlike the above-described case.

Further, in the illustrated embodiment, even when the steering wheel turning angle θs is smaller than the threshold value α, the switch determining section 35 does not switch the maps 25 as long as the second operating angle speed ωta is greater than or equal to the threshold value β. In other words, for example, the steering wheel may be continuously operated in, for example, slalom driving in which the steering direction is continuously switched from the right to the left or the left to the right. In this state, the steering feel is likely to be changed through switching of the variable transmission ratio characteristics. However, the illustrated configuration prevents the variable transmission ratio characteristics from being switched and thus maintains the steering feel in a desirable state even when the steering wheel is being continuously manipulated.

The illustrated embodiment may be modified as follows.

In the illustrated embodiment, the variable transmission ratio characteristics are switched through switching of the maps 25 by the first computing section 23, or change of the first command angle θgr* corresponding to the steering wheel turning angle θs and the vehicle speed V. However, the present invention is not restricted to this. That is, switching of the variable transmission ratio characteristics may involve change of the method of the differentiation steering control computation by the second computing section 24, or change of the second command angle θls* corresponding to the vehicle speed V and the steering wheel turning speed ωs (through, for example, switching of the maps).

In the illustrated embodiment, the maps 25, or the variable transmission ratio characteristics, are switched "if the steering wheel turning angle θs is smaller than the threshold value α" (see FIG. 4). However, such switching may be carried out if, in addition to this condition, the condition that "the vehicle speed V is smaller than a predetermine speed" is met. Specifically, when the vehicle is traveling at high speed, a slight change of the steered angle θt may greatly influence the behavior of the vehicle. Thus, if the variable transmission ratio characteristics are prevented from being switched when the vehicle is traveling at high speed, the influence of change of the steered angle θt caused by switching of the variable transmission ratio characteristics on the behavior of the vehicle is further restricted.

Although the switch determining section 35 switches the maps 25 "if the second operating angle speed ωta is smaller than the predetermined threshold value β" in the illustrated embodiment, such switching may be carried out "if the steering wheel turning speed ωs is smaller than a predetermined threshold value". This modification also suppresses change of the steering feel caused by switching of the variable transmission ratio characteristics when the steering wheel is continuously manipulated.

Alternatively, the maps 25, or the variable transmission ratio characteristic, may be switched through variation of the threshold value α in correspondence with the vehicle speed V. In other words, as the vehicle speed V becomes greater, the influence of change of the steered angle θt on the behavior of the vehicle becomes greater. Thus, if the threshold value α is decreased as the vehicle speed V is increased, the influence of such change on the behavior of the vehicle is effectively suppressed. Further, if the vehicle speed V is low, the variable transmission ratio characteristics are switched further quickly while the influence of change of the steered angle θt on the behavior of the vehicle is suppressed.

Alternatively, the variable transmission ratio characteristics may be switched if, in addition to the aforementioned conditions, the condition that "the second operating angle θta is smaller than a predetermined threshold value" is met. In other words, a vehicle steering apparatus having a variable transmission ratio device may have active control function. In other words, using the variable transmission ratio device as the drive source, the steering apparatus automatically changes the steered angle θt regardless of manipulation of the steering wheel (by the driver). When the steering apparatus operates in accordance with this active control function, the second operating angle θta may be caused even if steering wheel turning angle θs is substantially "0". It is thus desired that the variable transmission ratio characteristics be prevented from being changed. Thus, if the condition of this modification is added to the conditions for switching the variable transmission ratio characteristics, the behavior of the vehicle is further reliably prevented from being influenced by change of the steered angle θt caused by such switching. Alternatively, when the active control function is expected to be used, the variable transmission ratio characteristics may be prevented from being changed "if the steering apparatus is operating in accordance with the active control function", which is a condition related more closely to such function.

The invention claimed is:

1. A vehicle steering apparatus for use with a steering wheel in a vehicle for turning a steered wheel, the vehicle steering apparatus comprising:
   a motor;
   a variable transmission ratio device; and
   a controller,
   wherein the variable transmission ratio device varies a transmission ratio between a steering wheel turning angle determined through manipulation of the steering wheel and a steered angle of the steered wheel by combining a first operating angle of the steered wheel determined through manipulation of the steering wheel with a second operating angle of the steered wheel determined through actuation of the motor, and the controller controls operation of the variable transmission ratio device to bring about predetermined variable transmission ratio characteristics, and maintains a plurality of types of variable transmission ratio characteristics in a switchable state,
   wherein, if the steering wheel turning angle is smaller than a predetermined threshold value, the controller switches the variable transmission ratio characteristics,
   wherein, if the steering wheel turning angle is greater than or equal to the threshold value, the controller does not switch the variable transmission ratio characteristics, and
   wherein the controller switches the variable transmission ratio characteristics if an angular speed of the second operating angle is smaller than a predetermined threshold value, and does not switch the variable transmission ratio characteristics if the angular speed of the second operating angle is greater than or equal to the threshold value.

2. The apparatus according to claim 1, wherein the controller switches the variable transmission ratio characteristics if a steering wheel turning speed is smaller than a predetermined threshold value, and does not switch the variable transmission ratio characteristics if the steering wheel turning speed is greater than or equal to the threshold value.

3. The apparatus according to claim 2, wherein the controller switches the variable transmission ratio characteristics when a vehicle speed is smaller than a predetermined speed, and does not switch the variable transmission ratio characteristics when the vehicle speed is greater than or equal to the predetermined speed.

4. The apparatus according to claim 2, wherein the controller changes the threshold value for the steering wheel turning speed in correspondence with the vehicle speed.

5. The apparatus according to claim 2, wherein the controller switches the variable transmission ratio characteristics if the second operating angle is smaller than a predetermined threshold value and does not switch the variable transmission ratio characteristics if the second operating angle is greater than or equal to the threshold value.

6. The apparatus according to claim 2, wherein the controller includes an active control function through which the controller controls operation of the variable transmission ratio device to change the steered angle automatically regardless of the manipulation of the steering wheel, and wherein the controller does not switch the variable transmission ratio characteristics during operating in accordance with the active control function.

7. The apparatus according to claim 1, wherein the controller switches the variable transmission ratio characteristics if a vehicle speed is smaller than a predetermined speed, and does not switch the variable transmission ratio characteristics if the vehicle speed is greater than or equal to the predetermined speed.

8. The apparatus according to claim 7, wherein the controller switches the variable transmission ratio characteristics if the second operating angle is smaller than a predetermined threshold value and does not switch the variable transmission ratio characteristics if the second operating angle is greater than or equal to the threshold value.

9. The apparatus according to claim 7, wherein the controller includes an active control function through which the controller controls operation of the variable transmission ratio device to change the steered angle automatically regardless of the manipulation of the steering wheel, and wherein the controller does not switch the variable transmission ratio characteristics during operating in accordance with the active control function.

10. The apparatus according to claim 1, wherein the controller switches the variable transmission ratio characteristics when a vehicle speed is smaller than a predetermined speed, and does not switch the variable transmission ratio characteristics when the vehicle speed is greater than or equal to the predetermined speed.

11. The apparatus according to claim 10, wherein the controller switches the variable transmission ratio characteristics if the second operating angle is smaller than a predetermined threshold value and does not switch the variable transmission ratio characteristics if the second operating angle is greater than or equal to the threshold value.

12. The apparatus according to claim 10, wherein the controller includes an active control function through which the controller controls operation of the variable transmission ratio device to change the steered angle automatically regardless of the manipulation of the steering wheel, and wherein the controller does not switch the variable transmission ratio characteristics during operating in accordance with the active control function.

13. The apparatus according to claim 1, wherein the controller changes the threshold value for the steering wheel turning angle in correspondence with the vehicle speed.

14. The apparatus according to claim 1, wherein the controller changes the threshold value for the second operating angle in correspondence with the vehicle speed.

15. The apparatus according to claim 1, wherein the controller switches the variable transmission ratio characteristics if the second operating angle is smaller than a predetermined threshold value and does not switch the variable transmission ratio characteristics if the second operating angle is greater than or equal to the threshold value.

16. The apparatus according to claim 1, wherein the controller includes active control function through which the controller controls operation of the variable transmission ratio device to change the steered angle automatically regardless of the manipulation of the steering wheel, and wherein the controller does not switch the variable transmission ratio characteristics during operating in accordance with the active control function.

17. The apparatus according to claim 1, wherein the variable transmission ratio characteristics are based on a shift position.

* * * * *